(12) United States Patent
Pularikkal et al.

(10) Patent No.: US 12,289,640 B2
(45) Date of Patent: Apr. 29, 2025

(54) SYSTEM AND METHOD FOR MAPPING POLICIES TO SD-WAN DATA PLANE

(71) Applicant: Cisco Technology, Inc., San Jose, CA (US)

(72) Inventors: Gangadharan Byju Pularikkal, San Jose, CA (US); Einar Nilsen-Nygaard, Kilmarnock (GB); Vivek Agarwal, Campbell, CA (US); Ajeet Pal Singh Gill, Fremont, CA (US); Ravi Sankar Mantha, Bangalore (IN); Saravanan Radhakrishnan, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 338 days.

(21) Appl. No.: 17/882,859

(22) Filed: Aug. 8, 2022

(65) Prior Publication Data

US 2023/0262525 A1 Aug. 17, 2023

Related U.S. Application Data

(60) Provisional application No. 63/311,249, filed on Feb. 17, 2022.

(51) Int. Cl.
*H04W 28/12* (2009.01)
*H04L 41/40* (2022.01)
*H04W 40/24* (2009.01)

(52) U.S. Cl.
CPC ............. *H04W 28/12* (2013.01); *H04L 41/40* (2022.05); *H04W 40/24* (2013.01)

(58) Field of Classification Search
CPC ...... H04W 28/12; H04W 40/24; H04L 41/40; H04L 41/0806; H04L 41/5041; H04L 41/0895; H04L 41/0894
See application file for complete search history.

(56) References Cited

U.S. PATENT DOCUMENTS

| | | | |
|---|---|---|---|
| 10,911,374 B1* | 2/2021 | Kumar | H04L 43/14 |
| 2018/0097657 A1 | 4/2018 | Dao et al. | |
| 2019/0268973 A1* | 8/2019 | Bull | H04W 92/02 |
| 2020/0067831 A1 | 2/2020 | Spraggins et al. | |
| 2020/0177503 A1* | 6/2020 | Hooda | H04L 12/4641 |
| 2020/0328978 A1* | 10/2020 | Gupta | H04L 61/5007 |
| 2020/0389796 A1* | 12/2020 | Olofsson | H04L 63/0227 |
| 2021/0037375 A1* | 2/2021 | Cakulev | H04W 8/186 |
| 2021/0084562 A1 | 3/2021 | Maria | |
| 2021/0136871 A1 | 5/2021 | Bull et al. | |
| 2021/0160175 A1* | 5/2021 | Gupta | H04L 12/2854 |

(Continued)

OTHER PUBLICATIONS

International Search Report and Written Opinion for International Application No. PCT/US2023/062018, mailed Jun. 16, 2023, 16 Pages.

*Primary Examiner* — Habte Mered
(74) *Attorney, Agent, or Firm* — Baker Botts L.L.P.

(57) ABSTRACT

In one embodiment, a method includes receiving one or more 5G software-defined wide area network (SD-WAN) policies, identifying one or more identity-based policies from the one or more 5G SD-WAN policies, communicating the identified one or more identity-based policies to one or more WAN routers, communicating one or more 5G bindings to the one or more WAN routers, and applying the identified one or more identity-based policies to one or more flows between the one or more WAN routers.

17 Claims, 5 Drawing Sheets

(56) References Cited

U.S. PATENT DOCUMENTS

| | | | |
|---|---|---|---|
| 2021/0218670 A1* | 7/2021 | Pande | H04L 45/52 |
| 2022/0014559 A1* | 1/2022 | Cairney | H04L 63/20 |
| 2023/0275833 A1* | 8/2023 | Hyun | H04L 47/00 |
| | | | 370/389 |
| 2024/0015817 A1* | 1/2024 | Lim | H04W 76/12 |

* cited by examiner

SYSTEM AND METHOD FOR MAPPING POLICIES TO SD-WAN DATA PLANE

RELATED APPLICATION

The present application claims priority to provisional U.S. Patent Application No. 63/311,249, filed Feb. 17, 2022, and entitled "System and Method for Mapping Policies to SD-WAN Data Plane."

TECHNICAL FIELD

The present disclosure relates generally to software defined networking in a wide area network (SD-WAN), and more specifically to mapping policies to an SD-WAN data plane.

BACKGROUND

SD-WAN is a key transport technology for end-to-end deployments in 5G networks. Presently, use cases for 5G rely on deterministic end-to-end quality of service (QoS) service level agreements (SLAs). Currently, SD-WAN fabric is not a suitable connectivity option for 5G deployments.

DESCRIPTION OF EXAMPLE EMBODIMENTS

Overview

Figure 1:
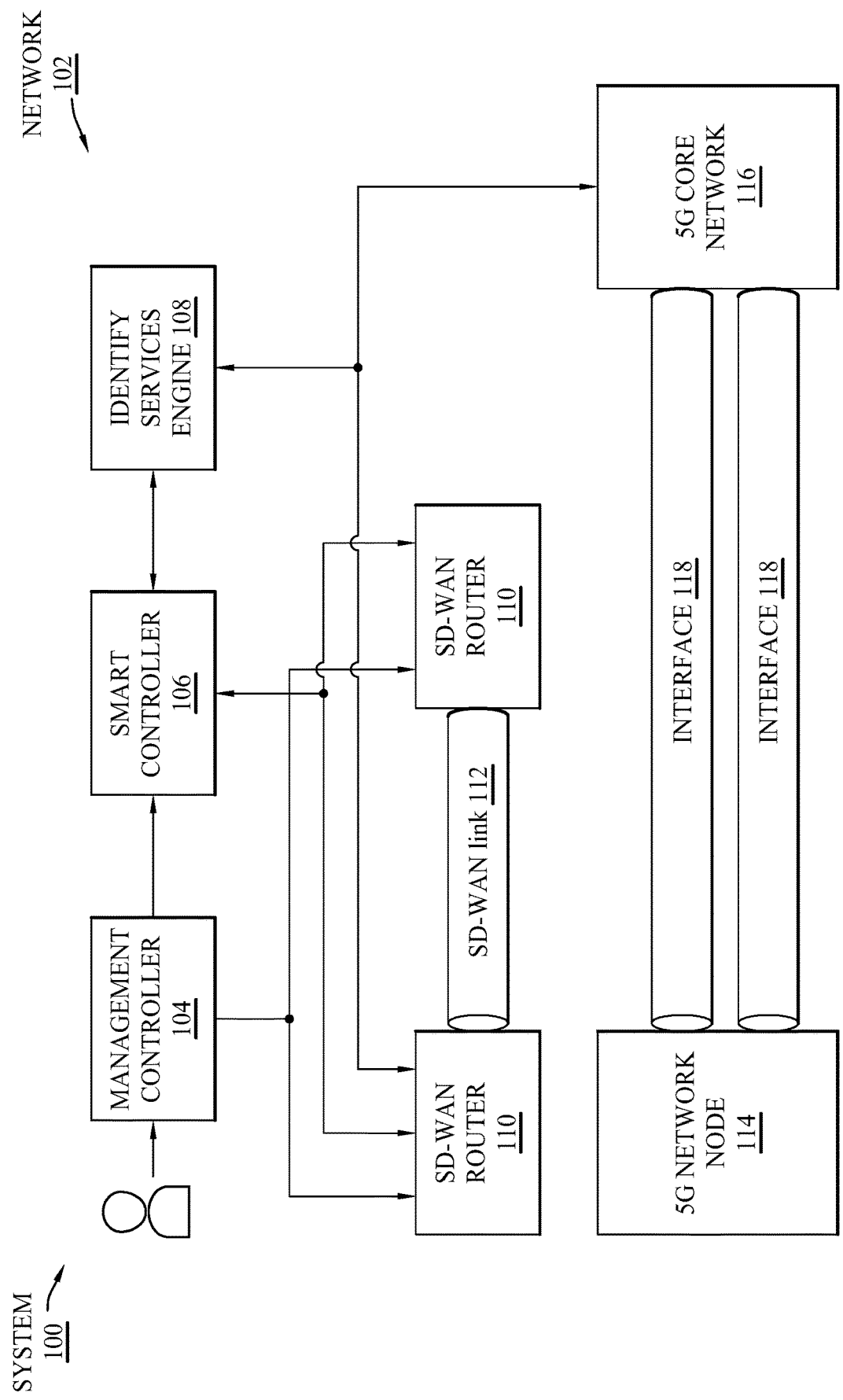
FIG. 1 illustrates a system for mapping 5G policies to an SD-WAN data plane, in accordance with certain embodiments.

According to an embodiment, a system includes one or more processors and one or more computer-readable non-transitory storage media. The one or more computer-readable non-transitory storage media include instructions that, when executed by the one or more processors, cause the system to perform operations including receiving one or more 5G software-defined wide area network (SD-WAN) policies, identifying one or more identity-based policies from the one or more 5G SD-WAN policies, communicating the identified one or more identity-based policies to one or more WAN routers, communicating one or more 5G bindings to the one or more WAN routers, and applying the identified one or more identity-based policies to one or more flows between the one or more WAN routers.

In certain embodiments, the operations further include updating the one or more WAN routers with the one or more 5G bindings. In further embodiments, the 5G bindings may be 5G context to user group bindings. In some embodiments, the system creates a table mapping one or more general packet radio service (GPRS) tunneling protocol (GTP) nodes to the WAN routers. In some embodiments, the system establishes a protocol data unit (PDU) session and transmits a PDU session context to an identity services engine. In further embodiments, the PDU session may include one or more classifiers. In some embodiments, the system identifies a packet for quarantine and transmits a notification to a user based on the identified packet. The notification may identify the packet and the reason for quarantine.

According to another embodiment, a method includes receiving one or more 5G SD-WAN policies, identifying one or more identity-based policies from the one or more 5G SD-WAN policies, communicating the identified one or more identity-based policies to one or more WAN routers, communicating one or more 5G bindings to the one or more WAN routers, and applying the identified one or more identity-based policies to one or more flows between the one or more WAN routers.

According to yet another embodiment, one or more computer-readable non-transitory storage media embody instructions that, when executed by a processor, cause the processor to perform operations including receiving one or more 5G SD-WAN policies, identifying one or more identity-based policies from the one or more 5G SD-WAN policies, communicating the identified one or more identity-based policies to one or more WAN routers, communicating one or more 5G bindings to the one or more WAN routers, and applying the identified one or more identity-based policies to one or more flows between the one or more WAN routers.

Technical advantages of certain embodiments of this disclosure may include mapping 5G policies to an SD-WAN data plane. Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Figure 2A:
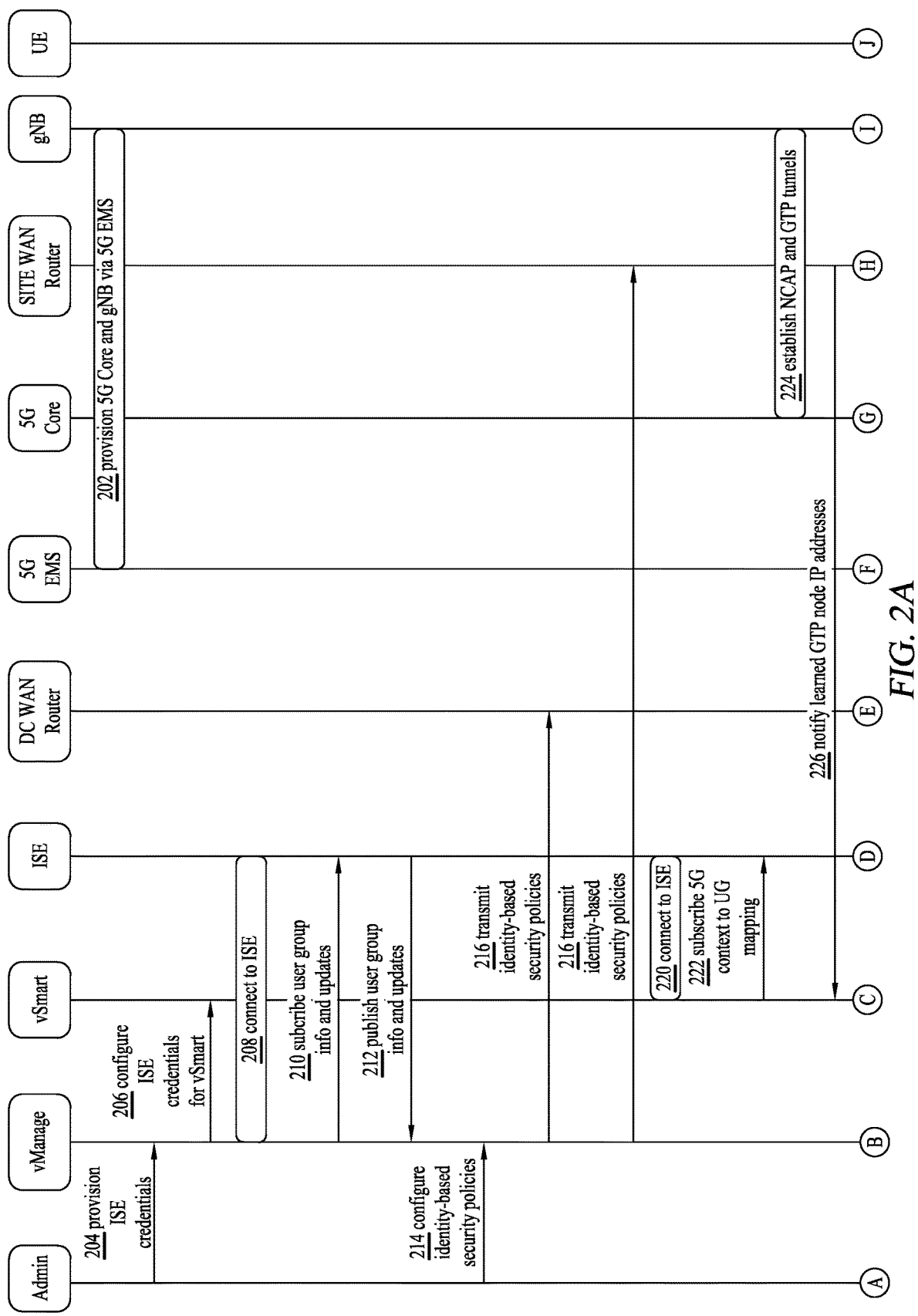
FIG. 2A illustrates a call flow diagram for mapping 5G policies to an SD-WAN data plane, in accordance with certain embodiments.
Figure 2B:
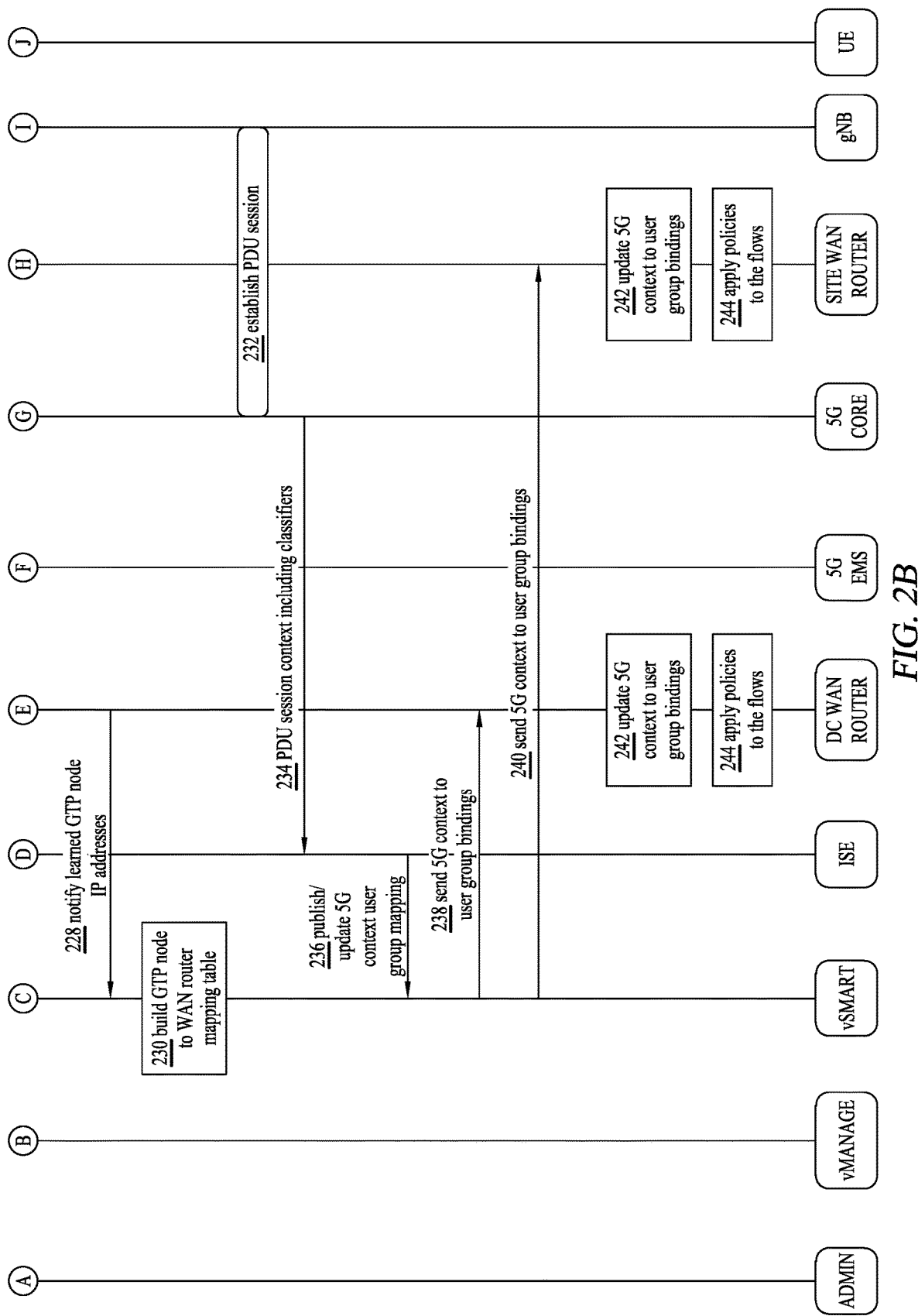
FIG. 2B illustrates a call flow diagram for mapping 5G policies to an SD-WAN data plane, in accordance with certain embodiments.
Figure 3:
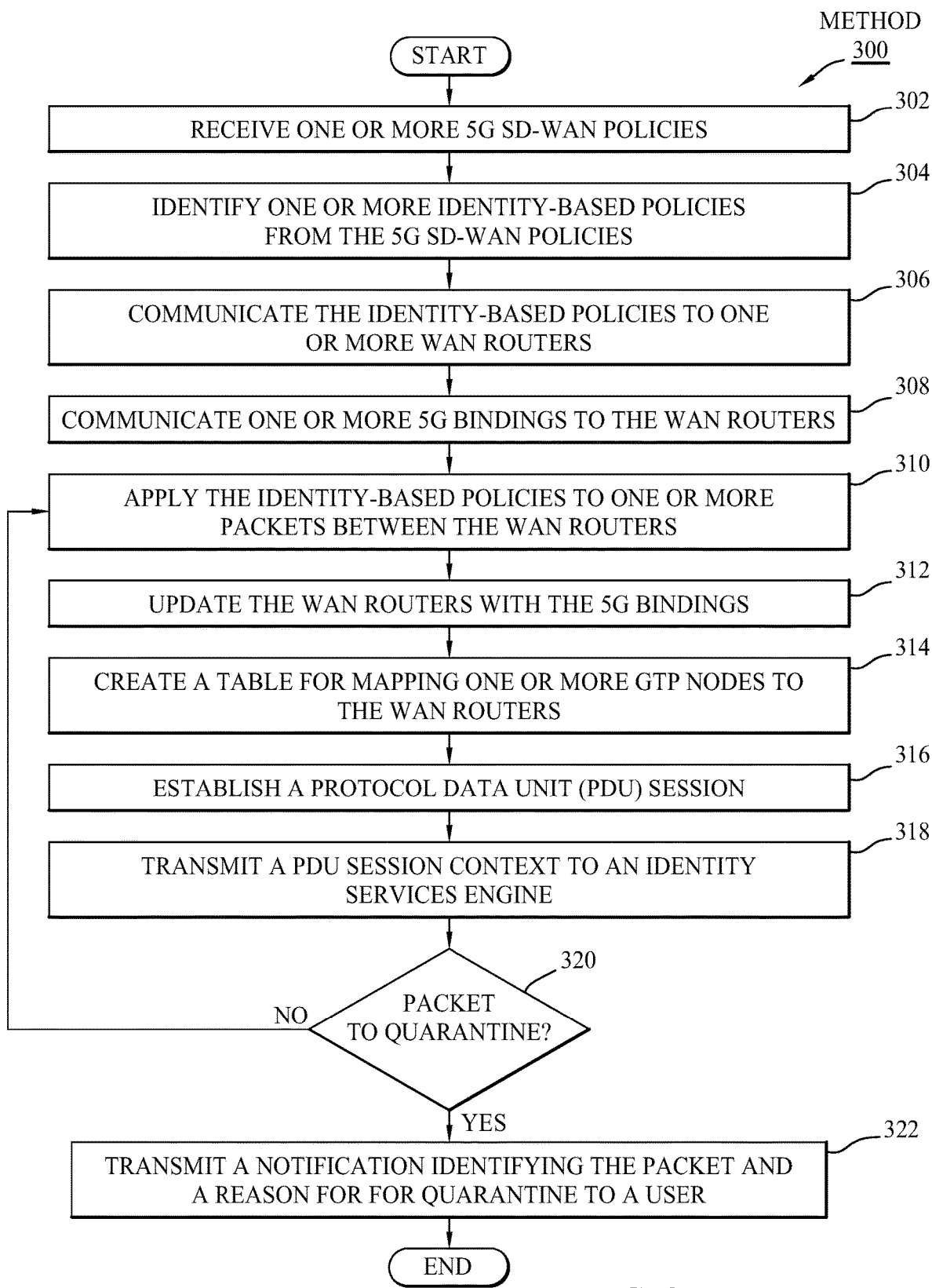
FIG. 3 illustrates a method for mapping 5G policies to an SD-WAN data plane, in accordance with certain embodiments.
Figure 4:
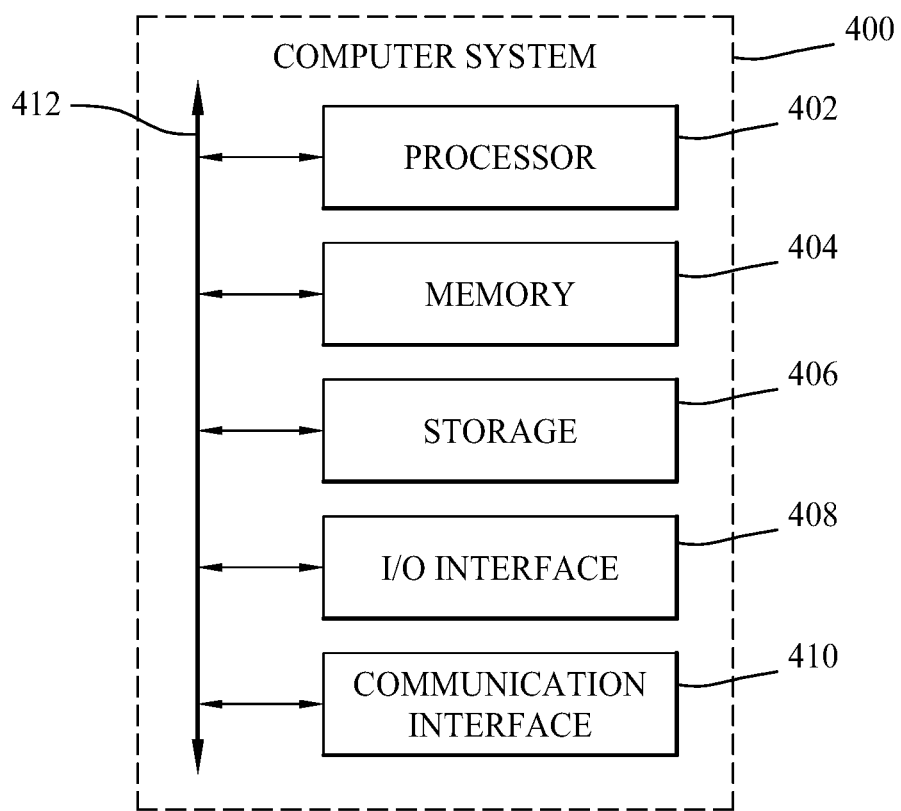
FIG. 4 illustrates an example of a computer system, in accordance with certain embodiments.

This disclosure describes systems and methods for mapping policies to an SD-WAN data plane. FIG. 1 illustrates a system for mapping 5G policies to an SD-WAN data plane, in accordance with certain embodiments. FIG. 2 illustrates a call flow diagram for mapping 5G policies to an SD-WAN data plane, in accordance with certain embodiments. FIG. 3 illustrates a method for mapping 5G policies to an SD-WAN data plane, in accordance with certain embodiments. FIG. 4 illustrates an example of a computer system, in accordance with certain embodiments.

FIG. 1 is a block diagram illustrating an example system 100, according to particular embodiments. System 100 or portions thereof may be associated with an entity, which may include any entity, such as a business or company (e.g., a service provider) that applies SD-WAN policies to incoming traffic. The components of system 100 may include any suitable combination of hardware, firmware, and software. For example, the components of system 100 may use one or more elements of the computer system of FIG. 4. In the illustrated embodiment, system 100 includes network 102, a management controller 104, a smart controller 106, an identity services engine (ISE) 108, SD-WAN routers 110, SD-WAN link 112, 5G network node 114, 5G core network 116, and interfaces 118.

Management controller 104 of system 100 represents a network controller that creates and/or maintains SD-WAN policies. Management controller 104 may identify identity-based policies from the received policies and transmit these identified identity-based policies to SD-WAN routers 110. Management controller 104 may include any suitable network device that facilitates controlling traffic in a network. In one embodiment, management controller 104 may be a Cisco vManage controller. Management controller 104 may include a processor, memory, storage, and interface. In certain embodiments, management controller 104 may provide functionality for monitoring network performance.

Smart controller 106 of system 100 represents a network controller that anchors the dynamic control plane of the SD-WAN. Smart controller 106 communicates one or more 5G bindings to SD-WAN routers 110. In certain embodiments, smart controller 106 creates a table mapping one or more general packet radio service (GPRS) tunneling (GTP) nodes to SD-WAN routers 110. In certain embodiments, smart controller 106 provides control for the SD-WAN domain. Examples of control provided by smart controller 106 may include controlling the flow of traffic to, from, and/or through the SD-WAN domain, facilitating connectivity to or among nodes (e.g., SD-WAN routers 110) of the SD-WAN domain, managing provisioning, maintenance, and/or security for the SD-WAN domain, overseeing the control plane of the SD-WAN fabric, etc. In one embodiment, smart controller 106 may be a Cisco vSmart controller. Smart controller 106 may include any suitable network device that facilitates controlling traffic in a network. Smart controller 106 may include a processor, memory, storage, and interface. In certain embodiments, smart controller 106 may store a mapping table in memory.

Identity services engine (ISE) 108 of system 100 may comprise a module having authentication, authorization, and accounting (AAA) capabilities. As known and understood by those of skill in the art, AAA capabilities may help secure the wireless network against unauthorized access.

SD-WAN routers 110 of system 100 represent network components that analyze data being sent across a network, determine routes for the data to travel the network based on the analysis, and/or communicate the data in accordance with the determined routes. In certain embodiments, SD-WAN routers 110 are used to connect multiple networks together. SD-WAN routers 110 may each be a virtual router or a physical router. SD-WAN routers 110 may be branch routers. SD-WAN routers 110 of system 100 receive traffic and determine an appropriate path through network 102 to route the incoming traffic. SD-WAN routers are connected via SD-WAN link 112.

5G network node 114 represents equipment that communicates directly or indirectly with a wireless device, wireless access point and/or with other network nodes or equipment in the wireless network to enable and/or provide wireless access to the wireless device and/or to perform other functions (e.g., administration) in the wireless network. For example, 5G network node 114 may include an access point (AP) (e.g., radio access points or WiFi APs), base stations (BSs) (e.g., radio base stations, Node Bs, evolved Node Bs (eNBs) and NR NodeBs (gNBs)).

5G core network 116 of system 100 represents the core network node of network 102. 5G core network 116 may include an Access and Mobility Management Function (AMF) implemented on suitable hardware and/or software. For example, in some embodiments, 5G core network may include memory, processors, and one or more interfaces, which may be used to implement one or more functions of 5G core network. 5G core network 116 is connected to 5G network node 114 via interfaces 118. Interfaces 118 may use various IP-based communication protocols to carry packets within network 102 including general packet radio service (GPRS) tunneling protocol (GTP) and next generation application protocol (NGAP). Interfaces 118 may be any suitable hardware and/or software that facilitates communication between components in network 102.

When management controller 104 is provisioned with SD-WAN policies, management controller 104 communicates identity-based policies to SD-WAN routers 110. SD-WAN policies are used to influence the flow of traffic among SD-WAN links. SD-WAN policies may include topology policies, traffic flow policies, locally significant policies, and the like. SD-WAN router 110 routes the incoming traffic through network 102 according to one or more SD-WAN policies. In certain embodiments, SD-WAN policies may include QoS SLAs. SD-WAN routers 110 then apply the identity-based policies to one or more flows communicated between SD-WAN routers 110. In some embodiments, SD-WAN routers 110 are updated with one or more 5G bindings upon receiving the 5G bindings. In some embodiments, the 5G bindings are 5G context to user group bindings. The bindings bind traffic flowing through network 102 to 5G endpoints. SD-WAN routers 110 may also determine a received packet to quarantine based on certain policies. For example, packets may be quarantined based on various types of SD-WAN policies including access policies, segmentation-based policies, flow classification policies, path selection policies, and the like. Additionally, SD-WAN routers 110 may identify a received packet that should be quarantined based on the applied policies. If a packet is identified for quarantine, management controller 104 transmits a notification to a user identifying the packet and the reason for quarantine.

In an exemplary embodiment of operation, management controller 104 receives one or more 5G SD-WAN policies. Management controller 104 identifies from among the received policies one or more identity-based policies. Management controller 104 then communicates the identified identity-based policies to SD-WAN routers 110. Smart controller 106 then communicates one or more 5G bindings to SD-WAN routers 110. SD-WAN routers 110 apply the received identity-based policies to flows transmitted between SD-WAN routers 110 through network 102. In certain embodiments, SD-WAN routers 110 are updated with the received 5G bindings. In a further embodiment, the 5G bindings are 5G context to user group bindings that bind 5G context information to user groups in network 102. In certain embodiments, smart controller 106 creates a table mapping one or more GTP nodes to SD-WAN routers 110. In certain embodiments, SD-WAN router 110 may establish a protocol data unit (PDU) session and transmit a PDU session context to ISE 108. In a further embodiment, the PDU session context includes one or more classifiers. In certain embodiments, SD-WAN routers 110 identify a packet for quarantine based on the received identity-based policies and notify of a user in network 102 of the quarantined packet and the reason for quarantine.

Although FIG. 1 illustrates a particular number of networks 102, management controllers 104, smart controllers 106, ISEs 108, SD-WAN routers 110, and SD-WAN links 112, this disclosure contemplates any suitable number of networks 102, management controllers 104, smart controllers 106, ISEs 108, SD-WAN routers 110, and SD-WAN links 112. Additionally, this disclosure contemplates any suitable arrangement of network 102, management controller 104, smart controller 106, ISE 108, SD-WAN routers 110, and SD-WAN link 112. Additionally, this disclosure contemplates any suitable combination of any suitable components, devices, or systems carrying out any suitable actions.

FIG. 2 illustrates an exemplary call flow diagram for mapping 5G policies to an SD-WAN data plane, in accordance with certain embodiments. The call flow diagram begins at step 202. In step 202, 5G element management system (EMS) provisions a 5G core network and a Next Generation NodeB (gNB). In step 204, an administrator provisions the ISE credentials on vManage. In step 206, vManage configures the ISE credentials for vSmart. In step 208, vManage connects to the ISE. In step 210, vManage subscribes to user groups information and updates at the ISE. In step 212, the ISE publishes user groups information and updates on vManage. In step 214, the administrator configures identity-based policies on vManage. In step 216, vManage transmits identity-based policies to the data center (DC) WAN router. In step 218, vManage transmits identity-based policies to the site WAN router. In step 220, vSmart connects to the ISE. In step 222, vSmart subscribes to the 5G context to user group mapping at the ISE. In step 224, the 5G core network establishes NGAP and GTP tunnels on the gNB. In step 226, the site WAN router notifies vSmart of learned GTP node IP (Internet Protocol) addresses. In step 228, the DC WAN router notifies vSmart of learned GTP node IP addresses. In step 230, vSmart builds the GTP node to WAN router mapping table. In step 232, the 5G core network establishes the PDU session on the gNB. In step 234, the 5G core network provides the PDU session context including classifiers to the ISE. For example, an AMF element in the 5G core network generates the session context information provided by the 5G core network to the ISE. In step 236, the ISE publishes and updates vSmart with the 5G context to user group (UG) mapping. In step 238, vSmart sends the DC WAN router the 5G context to user group bindings. In step 240, vSmart sends the site WAN router the 5G context to user group bindings. In step 242, the DC WAN router and site WAN router update the 5G context to user bindings. For example, the 5G context to user group bindings may bind traffic flowing through a network to 5G endpoints. In step 244, the DC WAN router and site WAN router apply policies to the flows. For example, the DC WAN router and site WAN router may identify a received packet that should be quarantined based on the applied policies including various types of SD-WAN policies, such as access policies, segmentation-based policies, flow classification policies, path selection policies, and the like.

FIG. 3 illustrates a method for mapping 5G policies to an SD-WAN data plane, in accordance with certain embodiments. Method 300 begins at step 302. At step 302, a management controller receives one or more 5G SD-WAN policies. For example, management controller 104 of FIG. 1, which is located in network 102, may receive one or more 5G SD-WAN policies. SD-WAN policies are used to influence the flow of traffic among SD-WAN links. SD-WAN policies may include topology policies, traffic flow policies, locally significant policies, and the like. SD-WAN router 110 routes the incoming traffic through network 102 according to one or more SD-WAN policies. In certain embodiments, SD-WAN policies may include QoS SLAs. Method 300 then moves from step 302 to step 304.

At step 304 of method 300, the management controller identifies one or more identity-based policies from the 5G SD-WAN policies received at step 302. For example, management controller 104 of FIG. 1 may identify one or more identity-based policies. Method 300 then moves from step 304 to step 306.

At step 306 of method 300, the management controller communicates the identity-based policies identified at step 304 to one or more WAN routers. For example, management controller 104 of FIG. 1 may communicate the identity-based policies to SD-WAN routers 110. Method 300 then moves from step 306 to step 308.

At step 308 of method 300, a smart controller communicates one or more 5G bindings to the WAN routers. For example, smart controller 106 of FIG. 1 may communicate one or more 5G bindings to SD-WAN routers 110. Method 300 then moves from step 308 to step 310.

At step 310 of method 300, the WAN routers apply the identity-based policies communicated at step 306 to one or more packets transmitted between the WAN routers. For example, SD-WAN routers 110 of FIG. 1 may apply identity-based policies communicated by management controller 104 to packets transmitted between SD-WAN routers 110 over SD-WAN link 112. Method 300 then moves from step 310 to step 312.

At step 312 of method 300, the WAN routers are updated with the one or more 5G bindings communicated at step 308. For example, SD-WAN routers 110 of FIG. 1 may be updated with the 5G bindings communicated by smart controller 106. Method 300 then moves from step 312 to step 314.

At step 314 of method 300, the smart controller creates a table for mapping one or more GTP nodes to the WAN routers. For example, smart controller 106 of FIG. 1 may create a table for mapping one or more GTP nodes to SD-WAN routers 110. Method 300 then moves from step 314 to step 316.

At step 316 of method 300, a WAN router establishes a PDU session. For example, SD-WAN router 110 of FIG. 1 may establish a PDU session. Method 300 then moves from step 316 to step 318.

At step 318 of method 300, the WAN router transmits a PDU session context for the PDU session established at step 316 to an identity services engine. For example, SD-WAN router 110 of FIG. 1 may transmit a PDU session context to ISE 108. In certain embodiments, the PDU session context may include classifiers.

At step 320 of method 300, WAN routers determine if a packet should be quarantined based on the policies applied at step 310. For example, SD-WAN routers 110 of FIG. 1 may determine if a packet should be quarantined based on the applied identity-based policies. If the WAN routers determine the packet should be quarantined, method 300 moves from step 320 to step 322. If the WAN routers determine the packet should not be quarantined, method 300 moves from step 320 to step 310.

At step 322 of method 300, WAN routers transmit a notification to a user identifying the packet the WAN routers determined should be quarantined at step 320. The notification includes a reason the WAN routers determined the packet should be quarantined. For example, SD-WAN routers 110 of FIG. 1 may transmit a notification to a user identifying a packet that SD-WAN routers 110 determined should be quarantined, and the notification also includes the reason for which SD-WAN routers 110 determined the packet should be quarantined. Method 300 ends at step 322.

Although this disclosure describes and illustrates an example method 300 for a method for mapping 5G policies to an SD-WAN data plane including the particular steps of the method of FIG. 3, this disclosure contemplates any suitable method 300 for a method for mapping 5G policies to an SD-WAN data plane, including any suitable steps, which may include all, some, or none of the steps of the method of FIG. 3, where appropriate. Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example of a computer system, in accordance with certain embodiments. In particular embodiments, one or more computer systems 400 provide functionality described or illustrated herein. As an example, one or more computer systems 400 may be used to provide at least a portion of management controller 104, smart controller 106, identity services engine 108, SD-WAN router 110, SD-WAN link 112, 5G network node 114, 5G core network 116, or interface 118 described with respect to FIG. 1. As another example, one or more computer systems 400 may be used to perform one or more steps described with respect to FIG. 3. In particular embodiments, software running on one or more computer systems 400 provides functionality described or illustrated herein or performs one or more steps of one or more methods described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A system, comprising:
one or more processors; and
one or more computer-readable non-transitory storage media comprising instructions that, when executed by the one or more processors, cause one or more components of the system to perform operations comprising:
  receiving one or more 5G software-defined wide area network (SD-WAN) policies;
  identifying one or more identity-based policies from the one or more 5G SD-WAN policies;
  communicating the identified one or more identity-based policies to one or more WAN routers;
  communicating one or more 5G bindings to the one or more WAN routers;
  applying the identified one or more identity-based policies to one or more flows between the one or more WAN routers; and
  creating a table for mapping one or more general packet radio service (GPRS) tunneling protocol (GTP) nodes to the one or more WAN routers.

2. The system of claim 1, further comprising:
updating the one or more WAN routers with the one or more 5G bindings.

3. The system of claim 2, wherein the one or more 5G bindings are one or more 5G context to user group bindings.

4. The system of claim 1, further comprising:
establishing a protocol data unit (PDU) session; and
transmitting a PDU session context to an identity services engine.

5. The system of claim 4, wherein the PDU session context includes one or more classifiers.

6. The system of claim 1, further comprising:
identifying a packet for quarantine; and
transmitting a notification to a user based on the identified packet, wherein the notification identifies the packet and a reason for quarantine.

7. A method comprising:
receiving one or more 5G software-defined wide area network (SD-WAN) policies;
identifying one or more identity-based policies from the one or more 5G SD-WAN policies;
communicating the identified one or more identity-based policies to one or more WAN routers;
communicating one or more 5G bindings to the one or more WAN routers;
applying the identified one or more identity-based policies to one or more flows between the one or more WAN routers; and
creating a table for mapping one or more general packet radio service (GPRS) tunneling protocol (GTP) nodes to the one or more WAN routers.

8. The method of claim 7, further comprising:
updating the one or more WAN routers with the one or more 5G bindings.

9. The method of claim 8, wherein the one or more 5G bindings are one or more 5G context to user group bindings.

10. The method of claim 7, further comprising:
establishing a protocol data unit (PDU) session; and
transmitting a PDU session context to an identity services engine.

11. The method of claim 10, wherein the PDU session context includes one or more classifiers.

12. The method of claim 7, further comprising:
identifying a packet for quarantine; and transmitting a notification to a user based on the identified packet, wherein the notification identifies the packet and a reason for quarantine.

13. One or more computer-readable non-transitory storage media embodying instructions that, when executed by a processor, cause performance of operations comprising:
receiving one or more 5G software-defined wide area network (SD-WAN) policies;
identifying one or more identity-based policies from the one or more 5G SD-WAN policies;
communicating the identified one or more identity-based policies to one or more WAN routers;
communicating one or more 5G bindings to the one or more WAN routers;
applying the identified one or more identity-based policies to one or more flows between the one or more WAN routers; and
creating a table for mapping one or more general packet radio service (GPRS) tunneling protocol (GTP) nodes to the one or more WAN routers.

14. The one or more computer-readable non-transitory storage media of claim 13, the operations further comprising:
updating the one or more WAN routers with the one or more 5G bindings.

15. The one or more computer-readable non-transitory storage media of claim 14, wherein the one or more 5G bindings are one or more 5G context to user group bindings.

16. The one or more computer-readable non-transitory storage media of claim 13, the operations further comprising:
establishing a protocol data unit (PDU) session; and
transmitting a PDU session context to an identity services engine, wherein the PDU session context includes one or more classifiers.

17. The one or more computer-readable non-transitory storage media of claim 13, the operations further comprising:
identifying a packet for quarantine; and
transmitting a notification to a user based on the identified packet, wherein the notification identifies the packet and a reason for quarantine.

* * * * *